United States Patent
Kapoor et al.

(10) Patent No.: US 10,430,799 B1
(45) Date of Patent: Oct. 1, 2019

(54) SYSTEM AND METHOD FOR DETERMINING A TIME THRESHOLD GUARANTEE OF A TASK FOR UPDATING IN A PENALTY CLAUSE OF A SERVICE LEVEL AGREEMENT

(71) Applicant: Numerify, Inc., San Jose, CA (US)

(72) Inventors: Rahul Kapoor, Bellevue, WA (US); Ryan O'Shea, Blackwood, NJ (US); Florian Schouten, Wayland, MA (US)

(73) Assignee: Numerify, Inc., San Jose, CA (US)

( * ) Notice: Subject to any disclaimer, the term of this patent is extended or adjusted under 35 U.S.C. 154(b) by 215 days.

(21) Appl. No.: 15/424,404

(22) Filed: Feb. 3, 2017

(51) Int. Cl.
*G06Q 30/00* (2012.01)
*G06Q 10/06* (2012.01)

(52) U.S. Cl.
CPC ..... *G06Q 30/01* (2013.01); *G06Q 10/063114* (2013.01)

(58) Field of Classification Search
CPC .. G06F 11/34; G06Q 10/06; G06Q 10/06395; G06Q 30/0283
See application file for complete search history.

(56) References Cited

U.S. PATENT DOCUMENTS

| | | | | |
|---|---|---|---|---|
| 5,798,950 A * | 8/1998 | Fitzgerald | ......... | G06Q 10/06 700/100 |
| 5,890,134 A * | 3/1999 | Fox | ......... | G06Q 10/06 700/100 |
| 5,918,219 A * | 6/1999 | Isherwood | ......... | G06Q 10/04 235/378 |
| 6,519,763 B1 * | 2/2003 | Kaufer | ......... | G06Q 10/109 706/21 |
| 6,550,053 B1 * | 4/2003 | Muckley | ......... | G06Q 10/109 702/102 |
| 6,691,080 B1 * | 2/2004 | Tachibana | ......... | G06F 11/3457 703/17 |
| 6,889,196 B1 * | 5/2005 | Clark | ......... | G06Q 10/0631 705/7.12 |

(Continued)

OTHER PUBLICATIONS

Rummel, Bernard, Probability Plotting: A Tool for Analyzing Task Completion Times Journal of Usability Studies, vol. 9, No. 4, Aug. 2014 (Year: 2014).*

(Continued)

*Primary Examiner* — Scott L Jarrett
(74) *Attorney, Agent, or Firm* — Rahman LLC (57) ABSTRACT

Automatically determining time threshold guarantees for metrics like completion time or first response time for tasks or items. A system relies on the historical tasks data with completion or first response times. The system plots a graphical representation between completion time and a percentage of tasks completed and uses sophisticated analysis of slopes at different points of the graphical representation to determine time threshold guarantees below a specified maximum completion or first response time threshold, and above a specified minimum percentage of completion. The system also compensates for a variety of factors which may be changed from the time historical data was obtained to the present time for which time threshold guarantees are being determined. In absence of historical customer data, the system makes the recommendations based on available datasets of peer customers.

8 Claims, 8 Drawing Sheets

(56) References Cited

U.S. PATENT DOCUMENTS

| | | | | |
|---|---|---|---|---|
| 6,917,979 | B1* | 7/2005 | Dutra | H04L 41/5009 709/207 |
| 6,925,493 | B1* | 8/2005 | Barkan | G06F 11/3495 709/223 |
| 6,966,061 | B1* | 11/2005 | Vance | G06Q 10/00 705/7.24 |
| 7,107,496 | B1* | 9/2006 | D'Ippolito | H04L 41/0631 714/43 |
| 7,249,042 | B1* | 7/2007 | Doerr | G06Q 10/06 705/7.23 |
| 7,437,449 | B1* | 10/2008 | Monga | H04L 41/00 370/230 |
| 7,583,607 | B2 | 9/2009 | Steele | H04L 41/5003 370/252 |
| 7,734,765 | B2* | 6/2010 | Musman | G06F 11/3495 709/223 |
| 8,041,797 | B2* | 10/2011 | Childress | G06Q 10/06 709/223 |
| 8,073,730 | B2* | 12/2011 | Vanbeck | G06Q 10/0639 705/7.38 |
| 8,103,480 | B2* | 1/2012 | Korn | G06Q 10/06 702/186 |
| 8,219,997 | B2* | 7/2012 | Shimizu | G06F 9/5066 718/104 |
| 8,346,909 | B2* | 1/2013 | Dan | G06F 9/5083 709/224 |
| 8,392,923 | B2* | 3/2013 | Walters | G06F 9/4825 709/224 |
| 8,527,327 | B1* | 9/2013 | Lawrence | G06Q 10/103 705/7.27 |
| 8,898,307 | B2* | 11/2014 | Moon | H04L 67/322 705/28 |
| 8,930,954 | B2* | 1/2015 | Hildrum | G06F 9/4881 718/102 |
| 9,355,009 | B2* | 5/2016 | Chen | G06F 11/3433 |
| 9,626,640 | B2* | 4/2017 | Diao | G06Q 10/06316 |
| 2004/0174823 | A1* | 9/2004 | Steele | H04L 41/5003 370/252 |
| 2005/0096973 | A1* | 5/2005 | Heyse | G06Q 10/105 705/7.39 |
| 2006/0026010 | A1* | 2/2006 | van Moorsel | G06Q 10/10 705/400 |
| 2006/0106661 | A1* | 5/2006 | Oikawa | G06Q 10/06 705/7.13 |
| 2007/0055688 | A1* | 3/2007 | Blattner | G06F 17/30569 |
| 2007/0056727 | A1* | 3/2007 | Newman | E21B 41/00 166/250.01 |
| 2008/0004934 | A1* | 1/2008 | Fama | G06Q 10/06 705/7.21 |
| 2008/0195402 | A1* | 8/2008 | Dube | G06Q 10/06 705/1.1 |
| 2009/0055237 | A1* | 2/2009 | Henry | G06Q 10/06 705/7.16 |
| 2010/0274637 | A1* | 10/2010 | Li | G06Q 10/06 379/265.06 |
| 2011/0271220 | A1* | 11/2011 | Remsberg | G06Q 10/06 715/772 |
| 2013/0144679 | A1* | 6/2013 | Burnett | G06Q 10/0631 705/7.27 |
| 2013/0152040 | A1* | 6/2013 | Dollar | G06Q 10/06311 717/102 |
| 2013/0262527 | A1* | 10/2013 | Hunter | G06F 3/0484 707/805 |
| 2014/0180753 | A1* | 6/2014 | Scerrato | G06Q 10/0633 705/7.27 |
| 2014/0278686 | A1* | 9/2014 | Mullings | G06Q 10/1097 705/7.21 |
| 2014/0278719 | A1* | 9/2014 | Pinel | G06Q 10/06316 705/7.26 |
| 2015/0120349 | A1* | 4/2015 | Weiss | G06Q 10/06311 705/7.13 |
| 2018/0150783 | A1* | 5/2018 | Xu | G06F 9/485 |

OTHER PUBLICATIONS

Willett, JA, A New Tool for Effective and Efficient Project Management Pacific Northwest Laboratory, Dec. 2011 (Year: 2011).*

Pyron, Tim, Sams Teach Yourself Microsoft Project 98 in 24 Hours Sams Publication, May 7, 1998 (Year: 1998).*

Microsoft Project 2013, Project Workbook CustomGuide, Inc. 2013 (Year: 2013).*

Abdulahad, Mumtaz Abdullah, Project Duration Forecasting: a Comparison of Earned Value Analysis Method to Earned Schedule of Time Duration, Worcester Polytechnic Institute, Thesis, Apr. 30, 2015 (Year: 2015).*

* cited by examiner

SYSTEM AND METHOD FOR DETERMINING A TIME THRESHOLD GUARANTEE OF A TASK FOR UPDATING IN A PENALTY CLAUSE OF A SERVICE LEVEL AGREEMENT

RELATED APPLICATION

This application is related to U.S. patent application Ser. No. 15/424,412, filed on Feb. 3, 2017, entitled "Automated Determination of Optimum Asset Lifetimes," invented by Rahul Kapoor, the disclosure of which is hereby incorporated by reference for all purposes as if fully set forth herein.

TECHNICAL FIELD

The embodiments herein generally relate to a response or completion time tracking system, and more specifically to approaches for determining a time threshold guarantee of a task or incident.

BACKGROUND

Cloud based software is altering the way users work and live as well as the operation and management of today's enterprises. Cloud software involves publishing Service Level Agreements (SLA) to which cloud based software service providers observe and adhere. The relationship between the software service providers and the customers are typically governed by the Service Level Agreements. If the software service provider or the customers violate certain agreements or if the service level objectives are not satisfied, penalties may be incurred. The Service Level Agreements involve guarantees regarding uptime and availability. They may also promise a turnaround time for a first response or a time for completion for items like service tickets. This process requires human intervention for estimating suitable time threshold guarantees for responding to or completing tasks/items like service tickets. The uniqueness of each service ticket and the fact that service tickets are processed by humans makes it very difficult to estimate the time threshold guarantees for service tickets.

In a cost based approach for estimating the suitable time threshold, support costs associated with the first response/completion of tasks/items are calculated. Since each SLA breach is associated with a penalty, Penalty versus Support costs graph is plotted with costs on Y-axis and the percentage of items being responded to or completed on X-axis. As the percentage of items completed within SLA increases, the support costs rise but SLA breach costs come down. In other words, the more items which are completed or responded to within SLA time thresholds, the higher the support costs but lower the SLA breach penalty. The intersection point of the two curves is the break-even point. By using historical first response/completion time versus a percentage of item graphs, users can map the percentage of items at the breakeven point to estimate the time thresholds. However, this approach is very impractical to implement as cost graphs are not readily available and SLA penalty may not be determined until SLA thresholds are identified (so it cannot be relied upon to be available as an input).

In an alternate method, a user could use historical first response/completion time's graph for identifying suitable time thresholds. As the support costs are inversely correlated to time threshold values (i.e. bringing down time threshold values may mean more hiring and consequent increase in support costs), relying on the graphs with just completion/first response times serves as an approximation for the graphs with actual costs. Plotting of graphs between completion/first response times versus percentage of items is much easier than those of support costs, and also this method does not require SLA penalties as input which makes this approach a practical alternate method for identifying time thresholds. Once time thresholds are identified using completion/first response time graphs, users can figure out the support cost for the suggested time threshold, if the support cost graphs are available. Hence, user can also figure out the SLA penalty value to recommend for SLA breaches.

Even with the completion/first response time graphs, picking the right threshold value to maximize the percentage of items being responded to or completing within the threshold while ensuring that the threshold value is not very high is challenging. Moreover, it is even more challenging to estimate the suitable threshold values where historical completion or first response time data is not available.

Accordingly, there remains a need for a system and method for determining a time threshold guarantee for responding to or completing a task/item.

SUMMARY

In view of the foregoing, an embodiment herein provides one or more non-transitory computer readable storage mediums storing one or more sequences of instructions, which when executed by one or more processors, performs a method for automatically determining a time threshold guarantee of a task using a time threshold determination system. The method includes the steps of: (i) obtaining a table that comprises historical data, wherein the historical data comprises tasks and a completion time associated with the tasks for a customer; (ii) automatically determining a total number of tasks in the table; (iii) automatically analyzing data distribution of the table to identify a granularity for plotting percentage completion in a graphical representation between the completion time and a percentage of tasks completed, wherein the percentage completion granularity is initially set by analyzing the number of tasks for which the completion time is available; (iv) obtaining inputs from the customer to override (a) the percentage completion granularity, (b) a default minimum percentage of completion threshold to achieve, and (c) a maximum completion time threshold that should not be exceeded by the tasks, wherein the maximum completion time threshold is initially set to the maximum completion time obtained from the table; (v) automatically computing points to plot the graphical representation between the completion time and a percentage of tasks completed for the percentage completion granularity by (a) calculating the percentage of completion granularity of the total number of tasks and (b) computing an average completion time for each successive percentage of completion granularity of the tasks; (vi) automatically determining a slope for each consecutive set of points of the graphical representation; (vii) automatically determining a slope difference for each set of consecutive slopes; and (viii) automatically determining a time threshold guarantee below the maximum completion time threshold, and above the minimum percentage of completion by identifying one of (a) a point where the slope difference is highest and higher than at other points in concave up portions of the graphical representation, and (b) a point furthest to right of the minimum percentage of completion threshold and below the maximum completion time threshold in concave down portions of the graphical representation.

In one embodiment, the table is sorted in ascending order of the completion times upon retrieval. In another embodiment, the method includes the step of automatically analyzing the historical data to determine the completion time associated with the tasks before and after a change in the external factors to determine a correction factor for modifying the time threshold guarantee. The method further includes the step of automatically determining the correction factor based on improvements expected from changes in the external factors, wherein the time threshold guarantee is reduced when the external factors are improved. The external factors include at least one of a number of employees, skills of the employees, a task workload of the employees, timeliness of tasks assigned to the employees, or nature and complexity of the tasks.

In yet another embodiment, the method further includes the steps of (i) identifying one or more peer customers similar to the target customer for whom time threshold guarantees are being determined when historical warehouse data is not available for the target customer; and (ii) retrieving time threshold guarantees for one or more peer customers using the peer customer datasets. The method further includes the step of determining the time threshold guarantees for the target customer as the average of the time threshold guarantees obtained from one or more peer customers.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Some known mathematical concepts regarding curves in a graphical representation that are pertinent to the embodiment are summarized as follows. Slope of a line is a number that describes both the direction and the steepness of the line. It is calculated by defining the change in the Y coordinate divided by the corresponding change in the X coordinate. For a curve, slope can be measured at each point of the curve and is defined as the slope of the tangent line at that point. If the slope is positive the curve is increasing, if the slope is negative the curve is decreasing. The points where the slope is zero are referred to as stationary points. If the slope is increasing, the tangent line is below the curve and the curve appears as concave when seen from above and is called concave up. If the slope is decreasing, the tangent line is above the curve and the curve appears as concave when seen from below and is called concave down. The points where the slope changes from increasing value to decreasing value are referred as inflection points. If the curves can be specified by a function which is twice differentiable, a stationary point is a point where the first derivative is zero and an inflection point is a point on the graphical representation at which the second derivative has an isolated zero and changes sign (i.e. the second derivative is positive when the slope is increasing and the second derivative is negative when the slope is decreasing).

Various embodiments of the method and system disclosed herein provide a system for automatically determining a time threshold guarantee of a task using a time threshold determination system. To avoid duplication, the various embodiments herein are described for completion time threshold guarantee but the same technique is equally applicable to first response time and similar metrics. Referring now to the drawings, and more particularly to FIGS. 1 through 7, where similar reference characters denote corresponding features consistently throughout the figures, preferred embodiments are shown.

Figure 1:
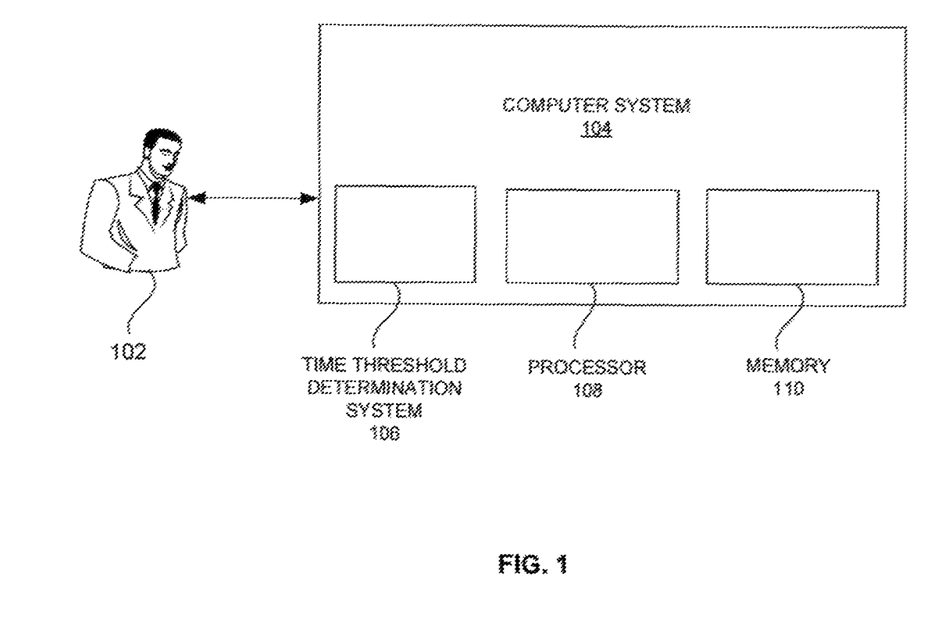
FIG. 1 is a system view illustrating a user interacting with a time threshold determination system using a computer system for determining a time threshold guarantee of a task according to an embodiment herein.

FIG. 1 is a system view illustrating a user 102 interacting with a time threshold determination system 106 using a computer system 104 for determining a time threshold guarantee of a task according to an embodiment herein. The computer system 104 further includes a memory 110 that stores instructions and a processor 108 configured by the instructions to execute the time threshold determination system 106. The memory/storage 110 further includes a database that stores historical data. The historical data may include tasks and completion times associated with the tasks, information on one or more of a number of employees, skills of the employees, a task workload of the employees, timeliness of tasks assigned to the employees, or nature and complexity of the tasks that impacts the completion times. The time threshold determination system 106 obtains a table that includes tasks and a completion time associated with the tasks for a customer. In an embodiment, the table is sorted in ascending order of the completion times. The time threshold determination system 106 automatically determines a total number of tasks in the table. The time threshold determination system 106 automatically analyzes data distribution of the table to identify a granularity (G) for plotting percentage completion in a graphical representation between the completion time and a percentage of tasks completed, so that there are at least 100/G tasks for which the completion time data is available. In other words, the percentage completion granularity is initially set by analyzing the number of tasks for which the completion time is available. The time threshold determination system 106 obtains inputs from the customer to override (a) the percentage completion granularity, (b) a default minimum percentage of completion threshold to achieve, and (c) a maximum completion time threshold that should not be exceeded by the tasks. In an embodiment, the maximum completion time threshold is initially set to the maximum completion time obtained from the table. The time threshold determination system 106 automatically computes points to plot the graphical representation between the completion time of the tasks and a percentage of tasks completed for the percentage completion granularity by (a) calculating the percentage of completion granularity of the total number of tasks, and (b) computing an average completion time for each successive percentage of completion granularity of the tasks.

The time threshold determination system 106 automatically determines a slope for each consecutive set of points of the graphical representation. The time threshold determination system 106 automatically determines a slope difference for each set of consecutive slopes. The time threshold determination system 106 automatically determines a time threshold guarantee below the maximum completion time threshold, and above the minimum percentage of completion by identifying one of (a) a point where the slope difference is highest and higher than at other points in concave up portions of the graphical representation, and (b) a point furthest to right of the minimum percentage of completion threshold and below the maximum completion time threshold in concave down portions of the graphical representation. The time threshold determination system 106 automatically analyzes the historical data to determine the completion time associated with the tasks before and after a change in the external factors. The time threshold determination system 106 determines a correction factor based on the completion time associated with the tasks for modifying the time threshold guarantee. In an embodiment, the external factors may include at least one of (a) a number of employees, (b) skills of the employees, (c) a task workload of the employees, (d) timeliness of tasks assigned to the employees, or (e) nature and complexity of the tasks. The time threshold determination system 106 automatically determines the correction factor based on improvements expected from changes in the external factors. For example, the time threshold guarantee may be reduced by 10% when the number of trained and skilled employees is being increased by 10%. In an embodiment, the correction factor used may be less than 10% when (i) the newly added employees are not as productive as the trained employees (i.e. experienced employees), or (ii) the completion time of the tasks is not linearly related to the number of employees. In another embodiment, the time threshold guarantee is reduced when the external factors are improved.

Figure 2:
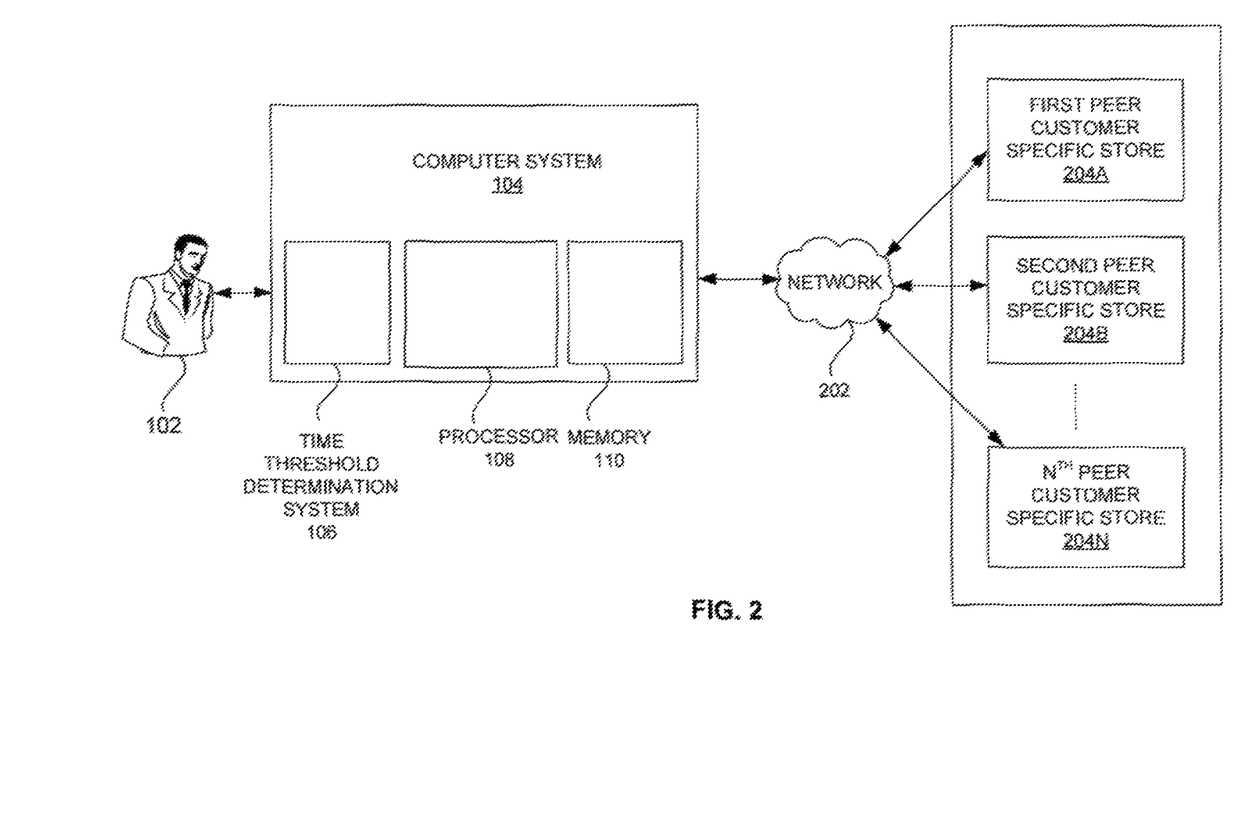
FIG. 2 is a system view illustrating the user interacting with the time threshold determination system using the computer system for retrieving time threshold guarantees from one or more peer customer specific stores according to an embodiment herein.

With reference to FIG. 1, FIG. 2 is a system view illustrating the user 102 interacting with the time threshold determination system 106 using the computer system 104 for retrieving time threshold guarantees from one or more peer customer specific stores 204A-N according to an embodiment herein. The system view includes the time threshold determination system 106, a network 202 and the one or more peer customer specific stores 204A-N. The time threshold determination system 106 may be communicatively connected to the one or more peer customer specific stores 204A-N through the network 202. The one or more peer customer specific stores 204A-N may include historical warehouse data. The historical warehouse data may include aggregation of time threshold guarantees (i.e. average of time threshold guarantees) corresponding to one or more peer customers obtained from the one or more peer customer specific stores 204A-N. The time threshold determination system 106 (i) identifies the one or more peer customers similar to the target customer for whom time threshold guarantees are being determined when historical warehouse data is not available for the target customer, and (b) retrieves time threshold guarantees for the one or more peer customers that are determined as described in FIG. 1 using the peer customer datasets. In an embodiment, the time threshold determination system 106 determines time threshold guarantees for the target customer as the average of the time threshold guarantees obtained from the one or more peer customers.

Figure 3:
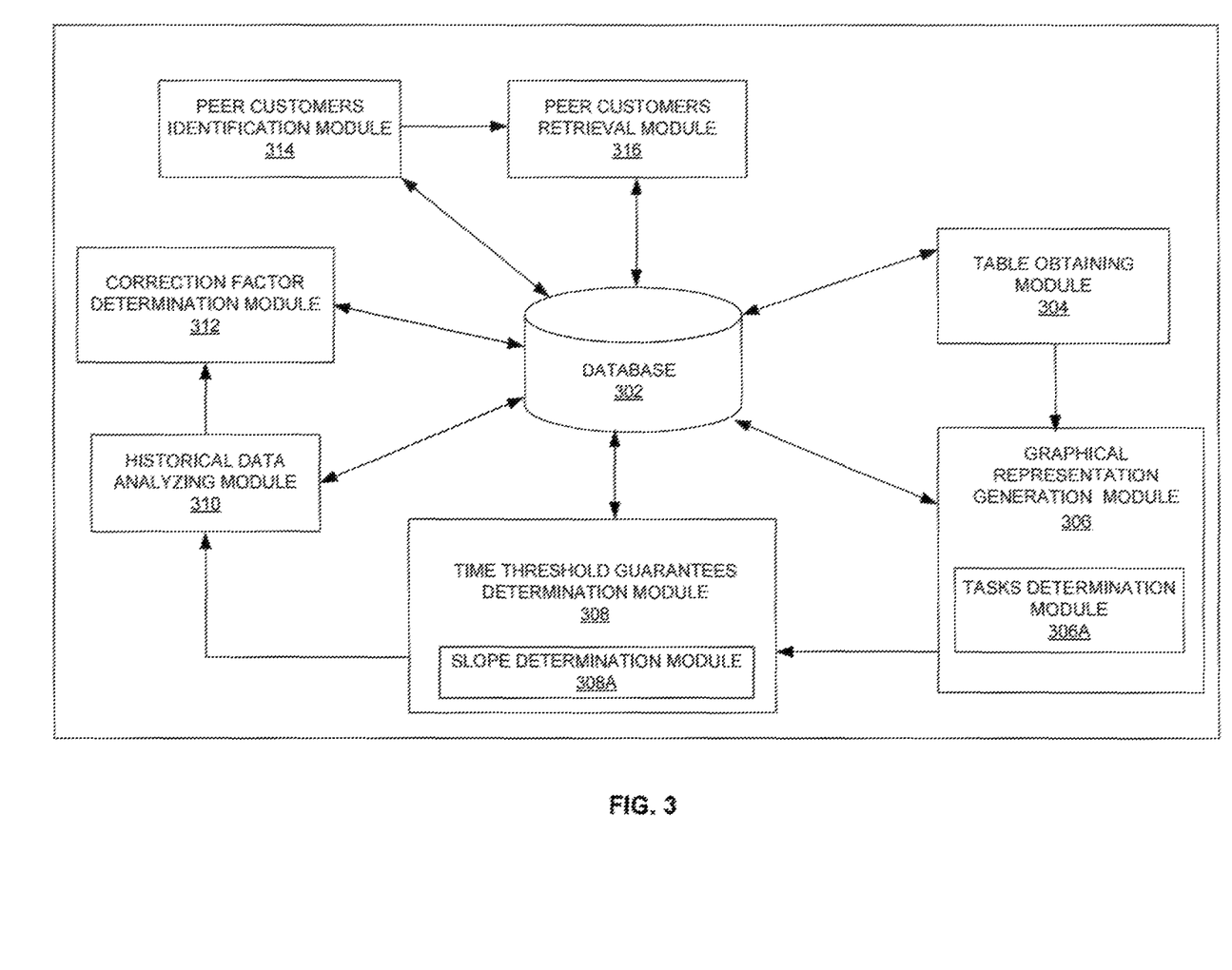
FIG. 3 illustrates an exploded view of the time threshold determination system of FIG. 1 according to an embodiment herein.

FIG. 3 illustrates an exploded view of the time threshold determination system 106 of FIG. 1 according to an embodiment herein. The time threshold determination system 106 includes a database 302, a table obtaining module 304, a graphical representation generation module 306, a time threshold guarantees determination module 308, a historical data analyzing module 310, a correction factor determination module 312, a peer customers identification module 314 and a peer customers retrieval module 316. The table obtaining module 304 obtains a table that includes tasks and a completion time associated with the tasks for a customer. The table may be sorted in ascending order of the completion times. The graphical representation generation module 306 includes a tasks determination module 306A that automatically determines a total number of tasks in the table. The graphical representation generation module 306 automatically analyzes data distribution of the table to identify a percentage completion granularity (G), for plotting a graphical representation between the completion time and a percentage of tasks completed so that there are at least 100/G tasks for which the completion time data is available. In an embodiment, the threshold determination system 106 obtains inputs (e.g. numerical values) from the customer to override (a) the percentage completion granularity, (b) a default minimum percentage of completion threshold to achieve, and (c) a maximum completion time threshold that should not be exceeded by the tasks. The maximum completion time threshold may be initially set to the maximum completion time obtained from the table but the customer may choose to lower that or specify not to use a maximum limit. Similarly, the default minimum percentage of completion to achieve may be too low or too high for the customer so they may wish to override it. Also by overriding the percentage completion granularity the customer can achieve a coarser or finer plot. The graphical representation generation module 306 automatically computes points to plot the graphical representation between the completion time of the tasks and a percentage of tasks completed for the percentage completion granularity by (a) calculating the percentage of completion granularity of the total number of tasks and (b) computing an average completion time for each successive percentage of completion granularity of the tasks. The time threshold guarantees determination module 308 includes a slope determination module 308A that automatically determines a slope for each consecutive set of points of the graphical representation. Further, the slope determination module 308A automatically determines a slope difference for each set of consecutive slopes. The time threshold guarantees determination module 308 automatically determines a time threshold guarantee below the maximum completion time threshold, and above the minimum percentage of completion by identifying one of (a) a point where the slope difference is highest and higher than at other points in concave up portions of the graphical representation, and (b) a point furthest to right of the minimum percentage of completion threshold and below the maximum completion time threshold in concave down portions of the graphical representation.

The historical data analyzing module 310 automatically analyzes the historical data to determine the completion time associated with the tasks before and after a change in the external factors. The correction factor determination module 312 automatically determines a correction factor based on the completion time associated with the tasks for modifying the time threshold guarantee. The correction factor determination module 312 automatically determines the correction factor based on improvements expected from changes in the external factors. So for example if the number of employees has changed in the past and its impact can be isolated in the historical data, the time threshold determination system 106 determines completion times before and after the change in number of employees and uses that information to determine the correction factor to use for the present time when the number of employees has changed again. In an embodiment, the time threshold guarantee is reduced when the external factors are improved.

The peer customers' identification module 314 identifies the one or more peer customers similar to the target customer for whom time threshold guarantees are being determined when the historical warehouse data is not available for the target customer. The peer customer's retrieval module 316 retrieves time threshold guarantees for the one or more peer customers using the peer customer datasets. In an embodiment, the time threshold guarantees determination module 308 determines time threshold guarantees for the target customer as the average of the time threshold guarantees obtained from the one or more peer customers.

Figure 4:
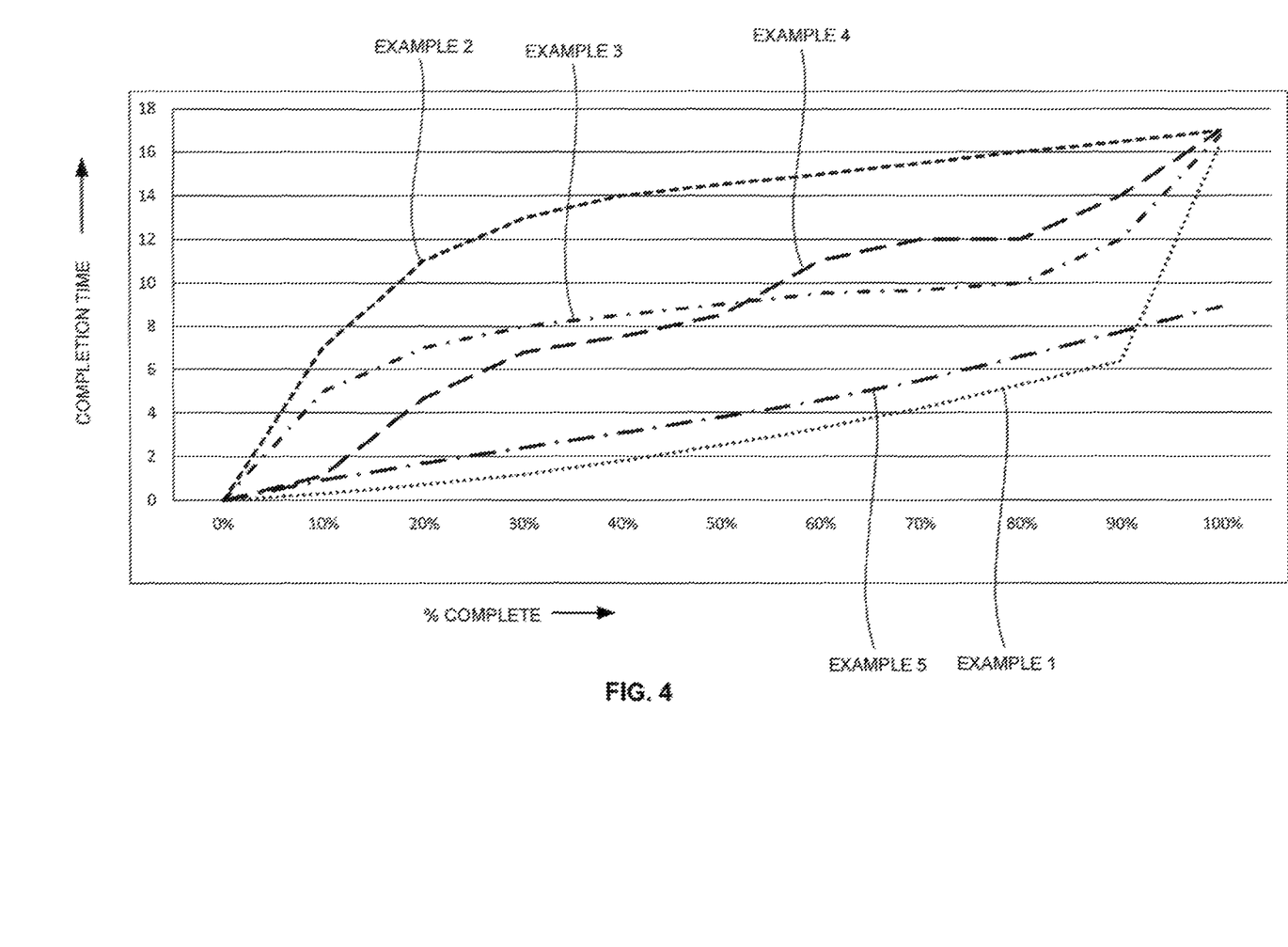
FIG. 4 illustrates a graphical representation that represents completion time of items versus a percentage of items completed according to an embodiment herein.

FIG. 4 illustrates a graphical representation that represents completion time of items versus a percentage of items completed according to an embodiment herein. The percentage of items/tasks completed is plotted on the X-axis. The time for completion of the items/tasks is plotted on the Y-axis. The graphical representation initially shows that no item/task is completed in zero completion time (e.g. X=0 when Y=0). In an embodiment, the percentage of items/tasks is 100% completed when the completion time reaches the highest value. The curves of the graphical representation show some possible variations as the percentage of completion of the items/tasks is varied between zero percentage and 100%. In Example 1, the curve represents most of the items/tasks completing within a small completion time window except some outliers that take a while to complete. So the shape of the curve is mostly flat or gently increasing as the percentage of items/tasks completed on X-axis increases.

In an embodiment, when the percentage of items/tasks completed on X-axis is increased to 100%, the completion time on Y-axis becomes much higher and the shape of the graphical representation changes to a steep curve. In Example 2, the curve represents a few of the items/tasks completing quickly with the remaining items/tasks completing in about the same completion time. Hence, the shape of the curve is steeply increasing for small values of X followed by a gentle increase as the percentage of items/tasks completed increases causing the curve to flatten out for higher values of percentage of items/tasks completed. In Example 3, the curve represents a few of the items completing quickly followed by a majority that complete in about the same time. At the end, there are a few outliers that take a while to complete. Hence, the curve steeply increases for the small values of X, then flattens out with a gentler increase and then steeply increases as the percentage of completion time approaches 100%. In Example 4, the curve represents one or more upswings in the completion time with periods of flattening in between the completion times. In Example 5, the curve represents the completion time increasing gradually and continuously. The graphical representation helps to determine a time threshold guarantee for completing a particular percentage of the items/tasks. In an embodiment, given a specified time threshold guarantee, the graphical representation may be used to determine a percentage of items/tasks that are expected to complete within the time threshold guarantee, or given a specified percentage of items/tasks completion threshold, the graphical representation may be used to determine an appropriate time threshold guarantee. More interestingly, the most suitable points of the graphical representation where the percentage of items completing within the threshold is above the minimum threshold value but the completion time threshold is reasonably low and below the maximum threshold value are determined automatically.

Figure 5:
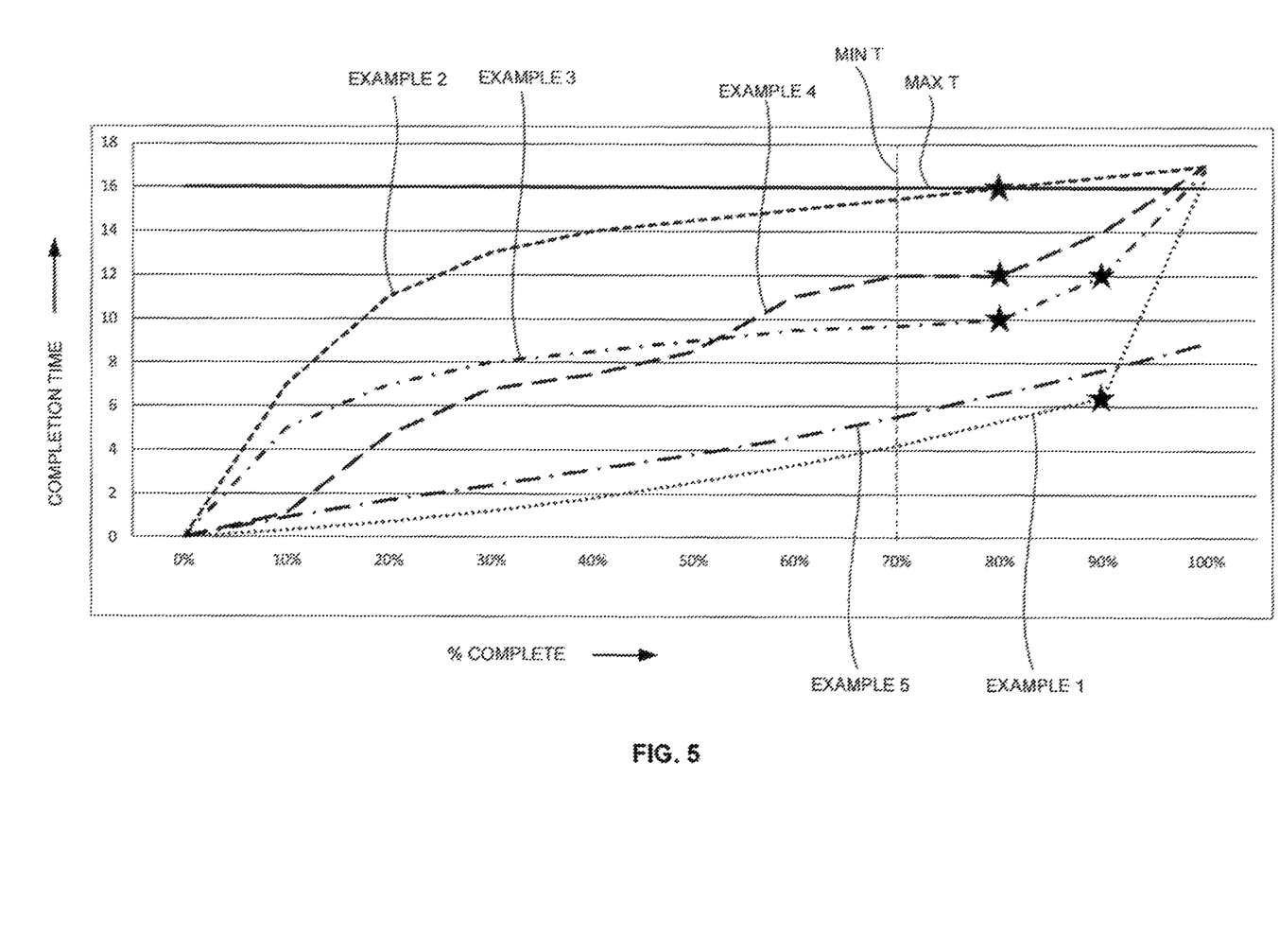
FIG. 5 overlays an optional maximum time threshold line and a minimum percentage of items completing line over the curves of FIG. 4 according to an embodiment herein.

FIG. 5 overlays an optional maximum time threshold line (MAX T) and a minimum percentage of items completing line (MIN T) over the curves of FIG. 4 according to an embodiment herein. The best time threshold values determined automatically are indicated by stars in the curves of the graphical representation. In Example 1, the curve represents that 90% of the items/tasks complete within time of 6.4 and for subsequent increase in percentage coverage of completion of items the completion time threshold rises steeply, so the completion time of 6.4 is a good time threshold to suggest. In Example 2, the curve represents 80% of the items completing within the maximum completion time specified value of 16 which is a good completion time threshold as reducing the time threshold below 16 causes the percentage of items completing to drop significantly for a small reduction in the suggested time threshold value. In Example 3, the curve represents 80% and 90% of the items completing within the completion time of 10 and 12 respectively. A completion time threshold which is below 10 may not help as the percentage of items completing drops significantly for a small reduction in the suggested time threshold value. A completion time threshold which is above 12 may not help as the additional percentage of items completing increase the completion time threshold steeply. In Example 4, the curve represents 80% of the items completing within the time completion window of 12 which is the suggested completion time threshold as the completion time threshold which is below 12 causes the percentage of items/tasks completing to drop significantly for a small reduction in the time threshold value until the completion time reaches 8.5 which is below the minimum specified threshold. In Example 5, the curve represents that the completion time increases gradually and uniformly, so there is no clearly identifiable completion threshold to recommend. The graphical representation of FIG. 4 and FIG. 5 help to demonstrate possible nature of the curves and illustrate the challenges in determining completion time thresholds automatically.

The time threshold determination system 106 identifies time thresholds depending on the shape of the curve. In concave up portions of the graphical representation, the points are points where the slope of the curve changes significantly. These are the points marked with stars in Example 1, 3 and 4. In concave down portions of the graphical representation, a point furthest to the right of the minimum percentage of completion threshold and below the maximum completion time threshold are as marked with star in Example 2.

In an alternative approach, the graphical representation may be plotted with individual tasks on the X-axis and time for completion on the Y-axis. By plotting this way, the outliers (i.e. tasks that take long time to complete) may be easily identified. The completion time thresholds may be identified by displaying average and standard deviation of completion time. The standard deviation may be determined by calculating the square root of the average of the squared deviations of the values from their average value. The completion time thresholds may be determined using a predetermined scheme (e.g. at two times standard deviation) or left to the customer to define. To help in defining completion time thresholds, the time threshold determination system 106 computes and displays percentage completion as the users hover over the different threshold values.

Figure 6A:
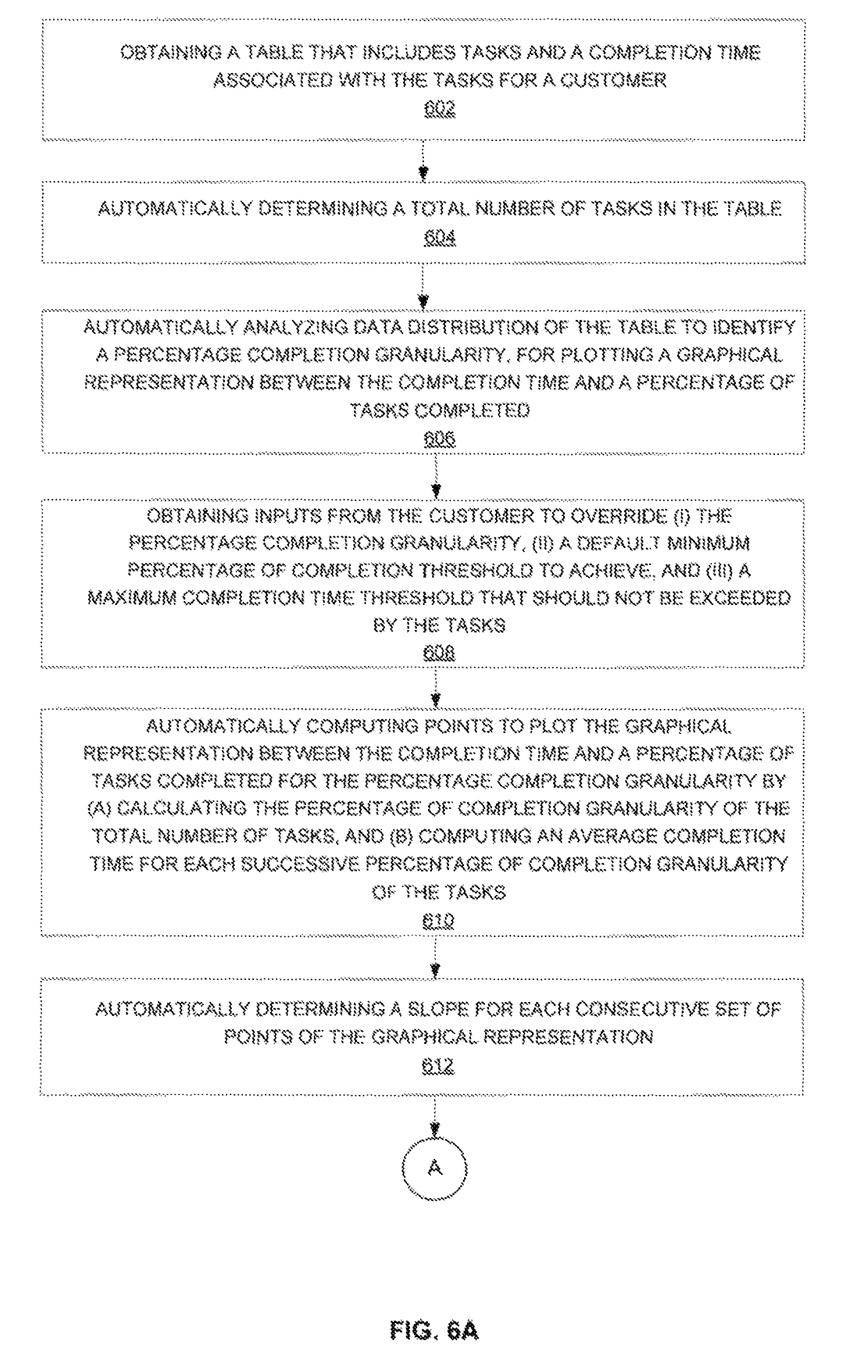
FIGS. 6A-6B are flow diagrams illustrating a method for automatically determining a time threshold guarantee of a task according to an embodiment herein.
Figure 6B:
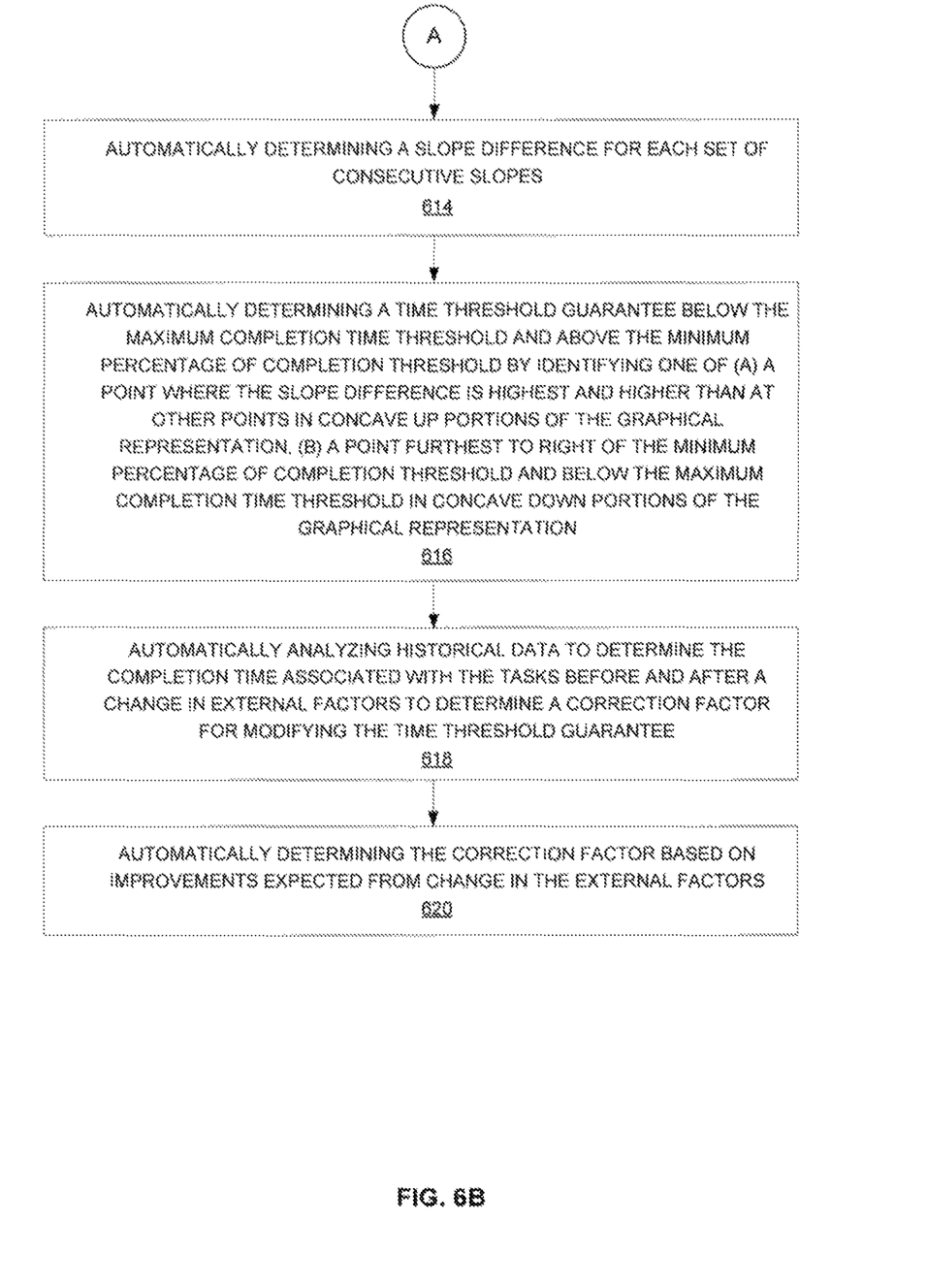

FIGS. 6A-6B are flow diagrams illustrating a method for automatically determining a time threshold guarantee of a task according to an embodiment herein. At step 602, a table that includes tasks and a completion time associated with the tasks for a customer is obtained. In an embodiment, the table is sorted in ascending order of the completion times. At step 604, a total number of tasks are automatically determined in the table. At step 606, data distribution of the table is automatically analyzed to identify a percentage completion granularity (G), for plotting a graphical representation between the completion time and a percentage of tasks completed so that there are at least 100/G tasks for which the completion time data is available. In other words, the percentage completion granularity is initially set by analyzing the number of tasks for which the completion time is available. At step 608, inputs are obtained from the customer to override (a) the percentage completion granularity, (b) a default minimum percentage of completion threshold to achieve, and (c) a maximum completion time threshold that should not be exceeded by the tasks. In an embodiment, the maximum completion time threshold is initially set to the maximum completion time obtained from the table. At step 610, points are automatically computed to plot the graphical representation between the completion time and a percentage of tasks completed for the percentage completion granularity by (a) calculating the percentage of completion granularity of the total number of tasks, and (b) computing an average completion time for each successive percentage of completion granularity of the tasks. At step 612, a slope is automatically determined for each consecutive set of points of the graphical representation. At step 614, a slope difference is automatically determined for each set of consecutive slopes. At step 616, a time threshold guarantee below the maximum completion time threshold, and above the minimum percentage of completion are automatically determined by identifying one of (a) a point where the slope difference is highest and higher than at other points in concave up portions of the graphical representation, and (b) a point furthest to right of the minimum percentage of completion threshold and below the maximum completion time threshold in concave down portions of the graphical representation. At step 618, the historical data is automatically analyzed to determine the completion time associated with the tasks before and after a change in the external factors to determine a correction factor for modifying the time threshold guarantee. The external factors may include at least one of a number of employees, skills of the employees, a task workload of the employees, timeliness of tasks assigned to the employees, or nature and complexity of the tasks. At step 620, the correction factor is automatically determined based on improvements expected from changes in the external factors. In an embodiment, the time threshold guarantee is reduced when the external factors are improved.

Figure 7:
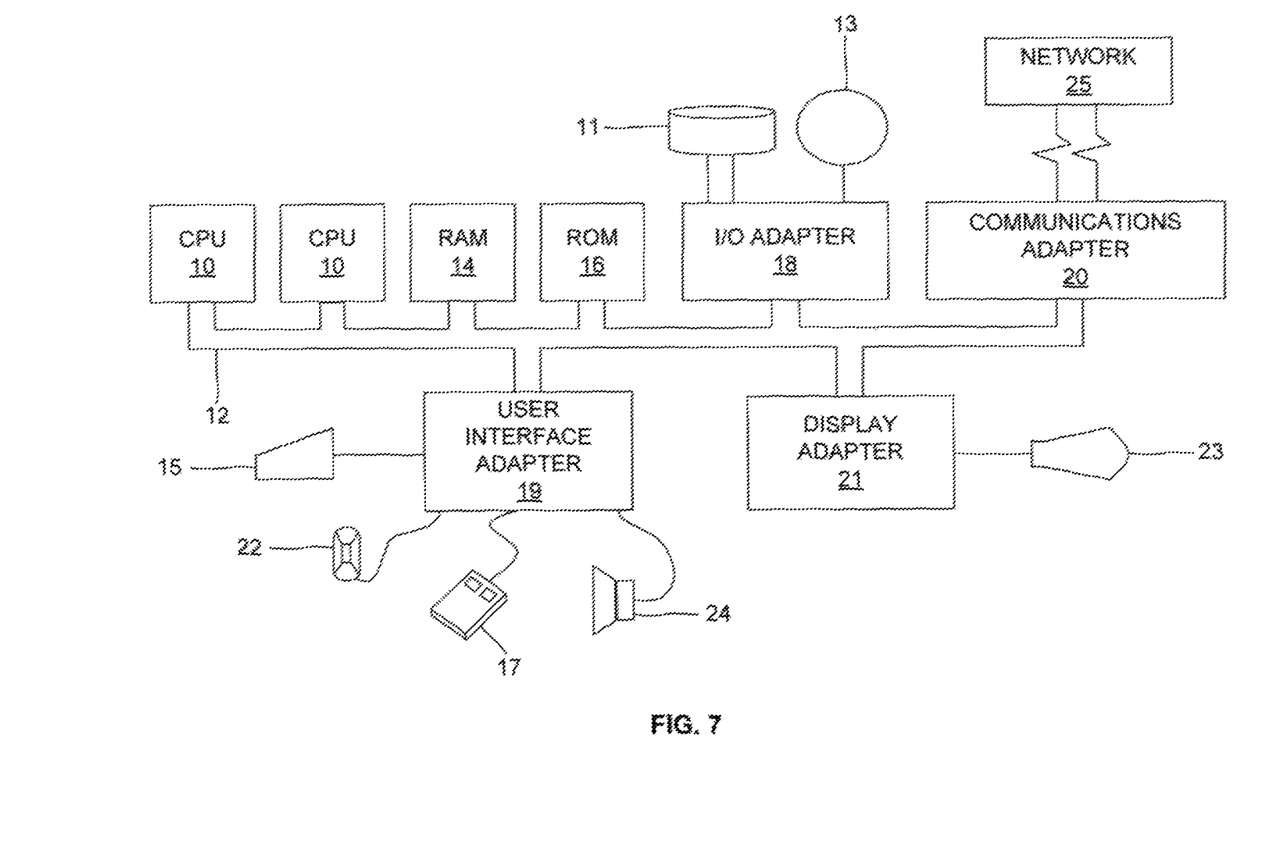
FIG. 7 is a computer system used in accordance with the embodiments herein.

FIG. 7, with reference to FIGS. 1 through 6B, is the computer system 104 of FIG. 1 used in accordance with the embodiments herein. The computer system 104 may include one or more of a personal computer, a laptop, a tablet device, a Smartphone, a mobile communication device, a personal digital assistant, or any other such computing device, in one example embodiment, in another example embodiment. This schematic drawing illustrates a hardware configuration of the computer system 104 in accordance with the embodiments herein. The computer system 104 includes one or more processor (e.g., the processor 108) or central processing unit (CPU) 10. The CPUs 10 are interconnected via system bus 12 to various devices such as a memory 14, read-only memory (ROM) 16, and an input/output (I/O) adapter 18. Although, CPUs 10 are depicted, it is to be understood that the computer system 104 may be implemented with only one CPU.

The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. One or more non-transitory computer readable storage mediums storing one or more sequences of instructions for automatically determining a time threshold guarantee of a task using a time threshold determination system and updating said time threshold guarantee in a penalty clause of a Service Level Agreement (SLA) of a service provider tool, which when executed by one or more processors, performs the steps of:

automatically determining, by a tasks determination module, a total number of tasks by analyzing a table that comprises historical data for each of a plurality of customers, wherein said historical data comprises a plurality of tasks and a completion time associated with each of said plurality of tasks for said plurality of customers, wherein said table is sorted in ascending order of said completion times upon retrieval by a table obtaining module;

automatically determining, by a graphical representation generation module, a granularity for plotting percentage completion in a graphical representation between said completion time and a percentage of tasks completed by analyzing data distribution of said table, wherein said analyzing of the data distribution of said table comprises:

determining a number of said plurality of tasks for which said completion time is available;

determining a percentage completion granularity (G) by ensuring that there are at least 100/G tasks for which the completion time data is available; and overriding if required by the plurality of customers (i) said percentage completion granularity, (ii) a default minimum percentage of completion threshold to achieve, and (iii) a maximum completion time threshold that should not be exceeded by said plurality of tasks, wherein said maximum completion time threshold is initially set to the maximum completion time obtained from said table;

automatically computing, by said graphical representation generation module, points to plot said graphical representation between said completion time and a percentage of tasks completed for said percentage completion granularity by (a) calculating said percentage of completion granularity of said total number of tasks and (b) computing an average completion time for each successive percentage of completion granularity of said plurality of tasks;

automatically determining, by a slope determination module, a slope for each consecutive set of points of said graphical representation;

automatically determining, by said slope determination module, a slope difference for each set of consecutive slopes;

automatically determining, by a time threshold guarantees determination module, for each of said plurality of customers, a time threshold guarantee below said maximum completion time threshold, and above said minimum percentage of completion by identifying one of (a) a point where said slope difference is highest and higher than at other points in concave up portions of said graphical representation, and (b) a point furthest to right of said minimum percentage of completion threshold and below said maximum completion time threshold in concave down portions of said graphical representation, and transforming the historical data, for each of the plurality of customers, into the time threshold guarantee;

automatically identifying, by a peer customers identification module, a plurality of peer customers similar to each of said plurality of customers for whom said time threshold guarantee is being determined and historical warehouse data is not available;

retrieving, by a peer customers retrieval module, time threshold guarantees of said plurality of peer customers, wherein said time threshold guarantee of said plurality of peer customers are obtained from a plurality of peer customer specific stores through a network; and determining, by said peer customers retrieval module, said time threshold guarantee for each of said plurality of customers for whom historical warehouse data is not available as the average of said time threshold guarantees of said plurality of peer customers obtained from said plurality of peer customers specific stores;

wherein said time threshold determination system updates said time threshold guarantee in a penalty clause of a Service Level Agreement (SLA) of a service provider tool, for each of said plurality of customers, for the practical application of imposing a penalty on the service provider when said time threshold is exceeded, wherein said time threshold guarantee is determined for a plurality of metrics associated with said plurality of customers.

2. The one or more non-transitory computer readable storage mediums of claim 1, wherein execution of the one or more sequences of instructions further cause a correction factor determination module to automatically determine:

said completion time associated with said plurality of tasks before and after a change in external factors as obtained from said historical data; and a correction factor, based on improvements identified in said completion time after the change in the external factors, for modifying said time threshold guarantee.

3. The one or more non-transitory computer readable storage mediums of claim 2, wherein said time threshold guarantee is reduced when said external factors are improved.

4. The one or more non-transitory computer readable storage mediums of claim 2, wherein said external factors comprise at least one of a number of employees, skills of said employees, a task workload of said employees, timeliness of tasks assigned to said employees, and nature and complexity of said tasks.

5. A computer implemented method for automatically determining a time threshold guarantee of a task using a time threshold determination system and updating said time threshold guarantee in a penalty clause of a Service Level Agreement (SLA) of a service provider tool, comprising:

automatically determining, by a tasks determination module, a total number of tasks by analyzing a table that comprises historical data for each of a plurality of customers, wherein said historical data comprises a plurality of tasks and a completion time associated with each of said plurality of tasks for said plurality of customers, wherein said table is sorted in ascending order of said completion times upon retrieval by a table obtaining module;

automatically determining, by a graphical representation generation module a granularity for plotting percentage completion in a graphical representation between said completion time and a percentage of tasks completed by analyzing data distribution of said table, wherein said analyzing of the data distribution of said table comprises:

determining a number of said plurality of tasks for which said completion time is available;

determining a percentage completion granularity (G) by ensuring that there are at least 100/G tasks for which the completion time data is available; and overriding if required by the plurality of customers (i) said percentage completion granularity, (ii) a default minimum percentage of completion threshold to achieve, and (iii) a maximum completion time threshold that should not be exceeded by said plurality of tasks, wherein said maximum completion time threshold is initially set to the maximum completion time obtained from said table;

automatically computing, by said graphical representation generation module, points to plot said graphical representation between said completion time and a percentage of tasks completed for said percentage completion granularity by (a) calculating said percentage of completion granularity of said total number of tasks and (b) computing an average completion time for each successive percentage of completion granularity of said plurality of tasks;

automatically determining, by a slope determination module, a slope for each consecutive set of points of said graphical representation;

automatically determining, by said slope determination module, a slope difference for each set of consecutive slopes;

automatically determining, by a time threshold guarantees determination module, for each of said plurality of customers, a time threshold guarantee below said maximum completion time threshold, and above said minimum percentage of completion by identifying one of (a) a point where said slope difference is highest and higher than at other points in concave up portions of said graphical representation, and (b) a point furthest to right of said minimum percentage of completion threshold and below said maximum completion time threshold in concave down portions of said graphical representation, and transforming the historical data, for each of the plurality of customers, into the time threshold guarantee;

automatically determining, by a correction factor determination module, said completion time associated with said plurality of tasks before and after a change in external factors by analyzing said historical data;

automatically determining, by said correction factor determination module, a correction factor, based on improvements identified in said completion time after the change in the external factors, for modifying said time threshold guarantee, wherein said external factors comprise at least one of number of employees, skills of said employees, a task workload of said employees, timeliness of tasks assigned to said employees, or nature and complexity of said tasks;

automatically identifying, by a peer customers identification module, a plurality of peer customers similar to each of said plurality of customers for whom said time threshold guarantee is being determined and historical warehouse data is not available;

retrieving, by a peer customers retrieval module, time threshold guarantees of said plurality of peer customers, wherein said time threshold guarantee of said plurality of peer customers are obtained from a plurality of peer customer specific stores through a network; and determining, by said peer customers retrieval module, said time threshold guarantee for each of said plurality of customers for whom historical warehouse data is not available as the average of said time threshold guarantees of said plurality of peer customers obtained from said plurality of peer customers specific stores;

updating said time threshold guarantee in a penalty clause of a Service Level Agreement (SLA) of a service provider tool, for each of said plurality of customers, for the practical application of imposing a penalty on the service provider when said time threshold is exceeded, wherein said time threshold guarantee is determined for a plurality of metrics associated with said plurality of customers.

6. A time threshold determination system that automatically determines a time threshold guarantee of a task and updates said time threshold guarantee in a penalty clause of a Service Level Agreement (SLA) of a service provider tool, said time threshold determination system comprising:

a memory that stores a database and a set of modules, wherein said database stores historical data, for a plurality of customers, that comprises, for each said customer, a plurality of tasks and completion times associated with each of said plurality of tasks, information on one or more of a number of employees, skills of said employees, a task workload of said employees, timeliness of tasks assigned to said employees, or nature and complexity of said tasks that impacts completion times; and a processor that executes said set of modules, wherein said set of modules comprises:

a tasks determination module, which when executed by the processor, automatically determines a total number of tasks by analyzing a table, for each of said plurality of customers, that comprises plurality of tasks and a completion time associated with each of said plurality of tasks for said plurality of customers, wherein said table is sorted in ascending order of said completion times upon retrieval by a table obtaining module;

a graphical representation generation module, which when executed by the processor, (i) automatically determines a granularity for plotting percentage completion in a graphical representation between said completion time and a percentage of tasks completed by analyzing data distribution of said table, wherein said analyzing of the data distribution of said table comprises:

determining a number of said plurality of tasks for which said completion time is available;

determining a percentage completion granularity (G) by ensuring that there are at least 100/G tasks for which the completion time data is available; and overriding if required by the plurality of customers (i) said percentage completion granularity, (ii) a default minimum percentage of completion threshold to achieve, and (iii) a maximum completion time threshold that should not be exceeded by said plurality of tasks, wherein said maximum completion time threshold is initially set to the maximum completion time obtained from said table; and (ii) automatically computes points to plot said graphical representation between said completion time and a percentage of tasks completed for said percentage completion granularity by (a) calculating said percentage of completion granularity of said total number of tasks and (b) computing an average completion time for each successive percentage of completion granularity of said plurality of tasks;
a slope determination module, which when executed by the processor,
   automatically determines a slope for each consecutive set of points of said graphical representation; and
   automatically determines a slope difference for each set of consecutive slopes;
a time threshold guarantees determination module, which when executed by the processor, automatically determines, for each of said plurality of customers, a time threshold guarantee below said maximum completion time threshold, and above said minimum percentage of completion by identifying one of (a) a point where said slope difference is highest and higher than at other points in concave up portions of said graphical representation, and (b) a point furthest to right of said minimum percentage of completion threshold and below said maximum completion time threshold in concave down portions of said graphical representation, and transforming the historical data, for each of the plurality of customers, into the time threshold guarantee;
a peer customers identification module, which when executed by the processor, automatically identifies a plurality of peer customers similar to each of said plurality of customers for whom said time threshold guarantee is being determined and historical warehouse data is not available; and
a peer customers retrieval module, which when executed by the processor,
   retrieves time threshold guarantees of said plurality of peer customers, wherein said time threshold guarantee of said plurality of peer customers are obtained from a plurality of peer customer specific stores through a network; and
   determines said time threshold guarantee for each of said plurality of customers for whom historical warehouse data is not available as the average of said time threshold guarantees of said plurality of peer customers obtained from said plurality of peer customers specific stores;
wherein said time threshold determination system updates said time threshold guarantee in a penalty clause of a Service Level Agreement (SLA) of a service provider tool, for each of said plurality of customers, for the practical application of imposing a penalty on the service provider when said time threshold is exceeded, wherein said time threshold guarantee is determined for a plurality of metrics associated with said plurality of customers.

7. The time threshold determination system of claim 6, wherein said set of modules comprises a correction factor determination module, which when executed by the processor
   automatically determines said completion time associated with said plurality of tasks before and after a change in said external factors; and
   automatically determines a correction factor, based on improvements observed in said completion time after the change in the external factors, for modifying said time threshold guarantee, wherein said external factors comprise at least one of number of employees, skills of said employees, a task workload of said employees, timeliness of tasks assigned to said employees, or nature and complexity of said tasks.

8. The time threshold determination system of claim 7, wherein said time threshold guarantee is reduced when said external factors are improved.

* * * * *